United States Patent [19]

Yanase et al.

[11] Patent Number: 4,649,172
[45] Date of Patent: Mar. 10, 1987

[54] POLYACETAL RESIN COMPOSITION

[75] Inventors: Yukimasa Yanase, Nishinomiya; Tsuneyoshi Okada, Fuji, both of Japan

[73] Assignee: Polyplastics Co., Ltd., Japan

[21] Appl. No.: 725,192

[22] Filed: Apr. 19, 1985

[30] Foreign Application Priority Data

Apr. 19, 1984 [JP] Japan .................................. 59-79289

[51] Int. Cl.[4] ........................... C08K 3/34; C08K 3/10
[52] U.S. Cl. .................................. 524/413; 524/512; 524/593
[58] Field of Search .................. 524/413, 512, 593; 525/154

[56] References Cited

U.S. PATENT DOCUMENTS

| 3,005,795 | 10/1961 | Busse et al. | 525/154 |
| 3,294,871 | 12/1966 | Schmitt et al. | 525/154 |
| 4,100,245 | 7/1978 | Horikawa et al. | 524/593 |
| 4,506,053 | 3/1985 | Sakurai et al. | 524/413 |
| 4,526,921 | 7/1985 | Sakurai et al. | 524/413 |

FOREIGN PATENT DOCUMENTS

| 59-207050 | 11/1984 | Japan | 524/413 |
| 1251641 | 12/1971 | United Kingdom | 524/413 |

Primary Examiner—Lewis T. Jacobs
Attorney, Agent, or Firm—Burns, Doane, Swecker & Mathis

[57] ABSTRACT

A polyacetal resin composition comprises a polyacetal and a potassium titanate fiber, being suitable for moulding a slidable part or article.

5 Claims, No Drawings

POLYACETAL RESIN COMPOSITION

The present invention relates to a polyacetal resin composition having superior friction characteristics, rigidity and the like suitable for producing sliding members such as switch parts used in electric circuits or parts such as various kinds of gear.

Polyacetal resins are superior in mechanical and physical properties and therefore have been widely used in various fields. Although they are superior also in friction-abrasion characteristics per se and can be used for sliding members and the like even without containing any fillers, high rigidity and strength are being required recently in addition to the superior friction-abrasion characteristics with the expansion of the uses of engineering plastics. It has been a general method of meeting such a requirement to add glass fibers to resins. However, the addition of glass fibers leads to the deterioration the friction-abrasion characteristics. That is, since the addition of glass fibers leads to the deterioration of the surface properties, materials sliding over against said resins, for example, metals or resins are worn and also the resins themselves are worn by powders produced in the above described abrasion of metals or resins, whereby the abrasion is further increased by this interaction. Accordingly, when polyacetal resins reinforced with glass fibers are used for sliding members such as switch parts, there are such problems that both resins and metals or resins sliding over against said resins are worn and a mal-operation of an electric circuit is induced due to powders produced in the above-described abrasion of metals or resins. In particular, since it is required that the abrasion is as little as possible when polyacetal resins reinforced with glass fibers are used for precision parts and the like, it is necessary to impart well-balanced high rigidity, high strength and superior friction-abrasion characteristics to resins used for precision parts and the like.

The present inventors found from their repeated investigations aiming at the development of a polyacetal resin having properties meeting the above-mentioned requirement that the addition of a potassium titanate fiber to a polyacetal resin was effective. Further, it was found that the addition of an abrasion resisting agent such as fluororesins, silicone or lubricants together with said potassium titanate fiber was still more effective. Thus the present invention was achieved. That is to say, the present invention relates to a polyacetal resin composition wherein a potassium titanate fiber is added to a polyacetal resin and at least one abrasion resisting agent selected from the group consisting of fluororesins, silicone and lubricants is added according to the desired uses thereof. The present invention will now be described in more detail.

A polyacetal resin used in the present invention includes a polyoxymethylene homopolymer or a copolymer of which main chain chiefly consists of an oxymethylene chain.

Potassium titanate fiber used in the present invention is a white acicular monocrystalline fiber having an average length of 5 to 120 microns, preferably 10 to 20 microns, and an average diameter of 0.1 to 1.0 microns, preferably 0.2 to 0.5 microns. In general, said potassium titanate fiber is added in an amount of 1 to 40% by weight based on the total composition. The addition of said potassium titanate fiber in an amount of less than 1% by weight does not bring about a sufficient reinforcement of the resin, while the addition in an amount exceeding 40% by weight is undesirable in respect of friction-abrasion characteristics. It is desirable that said potassium titanate fiber be added in an amount of 5 to 30% by weight. Further, in order to increase the adhesion of said potassium titanate fiber to the resin, the surface of said fiber may be treated with known surface treating agents. Said agents include those based on an aminosilane, an epoxysilane and a titanate, among which the one based on an aminosilane is particularly preferable.

According to the present invention, at least one abrasion resisting agent selected from the group consisting of fluororesins, silicone and lubricants can be added to polyacetal resin composition containing a potassium titanate fiber therein. Potassium titanate fiber has a plastic reinforcing performance similar to a glass fiber and the resulting composition containing the potassium titanate fiber is superior to those containing a glass fiber in surface flatness and abrasion resistance. Therefore, when the polyacetal resin containing the potassium titanate fiber is used as a sliding member, the abrasion is reduced in both parts in comparison with the Polyacetal resin containing a glass fiber. Thus the composition containing only the potassium titanate fiber may also be thought to be suitable. However, a slight abrasion still occurs in the sliding member and a maloperation due to powders formed by sliding may take place occasionally when the composition containing only a potassium titanate fiber is used as sliding parts such as switches and other electronic parts, electric parts and precision parts such as cameras or watches. As a result of repeated investigations aiming at the improvement in the above described points, the present inventors succeeded in obtaining a polyacetal resin composition having still more improved friction-abrasion characteristics by adding at least one abrasion resisting agent selected from the group consisting of fluororesins, silicone and lubricants to a polyacetal resin together with a potassium titanate fiber. According to the present invention, the abrasion resisting agent is in general added in an amount of 0.5 to 30% by weight based on the total composition.

Referring to the abrasion resisting agents, the fluororesins are those obtained by polymerizing a monomer in which hydrogen atoms of ethylene are substituted by at least one fluorine atom. Tetrafluoroethylene resin or difluoroethylene resin is usually used. Also copolymers of these fluororesins or fluororesins containing other elements in a part thereof can be used. Of these, the tetrafluoroethylene resin is preferably used. When fluororesins are used as abrasion resisting agents, they are preferably used in an amount of 2 to 10% by weight based on the total composition. The addition of a too small amount of said abrasion resisting agents leads to an insufficient improvement the abrasion resistance while excessive addition poses a problem of cost. It is desirable that the ratio of the potassium titanate fiber to the fluororesin is within the range of 40:1 to 1:1 by weight. In particular, if this ratio is within the range of 3:1 to 1:1 by weight, good results can be obtained, though other ratios may also be used according to uses.

The silicone is called generically organopolysiloxane and includes silicone oils, silicone rubbers and silicone resins. In particular, silicone oils comprising dimethylpolysiloxane of a considerably lower degree of polymerization and the like and/or silicone greases comprising silicone oils, metal soaps and the like are preferably used. The lubricants include those based on hydrocarbons, such as low molecular polyethylene wax, fatty acids, fatty acid amides, esters, metal soaps, fatty alcohols, polyhydric alcohols, polyglycols, polyglycerols, esters of fatty acids with polyhydric alcohols, esters of fatty acids with polyglycols or polyglycerols. Other common oily lubricants may also be used. Of these, metal soaps comprising metal salts of higher fatty acids are preferably used.

The composition according to the present invention can be produced by various methods. For example, pellets obtained by extruding a preblend consisting of a resin ingredient, potassium titanate fiber and fluororesin in an extruder are molded in a molding machine.

Known additives such as various kinds of organic high-molecular substance or inorganic fillers may further be added to the polyacetal resin composition according to the present invention according to the uses thereof. Said organic high-molecular substances include polyurethanes, vinylic compounds and copolymers thereof such as ethylene/vinyl acetate copolymer, ethylene/alkyl acrylate copolymer, styrene/butadiene/acrylonitrile copolymer and styrene/acrylonitrile copolymer; multi-phase graft copolymers comprising polyacrylate resins; and segmented thermoplastic copolyesters. Said inorganic fillers include glass fibers, carbon fibers, glass flakes, mica, talc, calcium carbonate, metal fibers, and metal foils. In addition, antistatic agents or electrical conductivity improving agents such as electrically conductive carbon black (Ketjen Black, a product of Lion Akzo), coloring agents, releasing agents, nucleating agents, stabilizers, surface active agents and the like may be added to the composition according to the present invention to give necessary properties thereto. These additives may be added when the potassium titanate fiber is blended with the resin, or may be added to the resin in the form of a mixture thereof with the potassium titanate fiber. Alternatively, they may be added together with a surface treating agent in the above-mentioned surface treatment process of the potassium titanate fiber, or may be adhered to the potassium titanate fiber by means of a spreading agent. Further, they may be strongly bonded to the potassium titanate fiber by chemical reactions.

The obtained composition according to the present invention shows not only remarkably superior friction-abrasion characteristics but also high rigidity and strength. Accordingly, they can be suitably used in the production of electronic parts, such as switches, and gears. The effects of the present invention will now be described in more detail with reference to examples and comparative examples.

EXAMPLES 1 TO 6:

Comparative Examples 1 to 4

A potassium titanate fiber, a fluororesin (tetrafluoroethylene resin) powders, silicone oil and a lubricant are added to a polyacetal resin (Duracon, a product of Polyplastics Co., Ltd.) in proportions as shown in Table. The resulting blend is extruded in an extruder and then molded in an injection molding machine to prepare test pieces for specific abrasion, bending strength and bending modulus. The results are shown in the same Table. Specific abrasion was measured under a "thrust" condition of S-55C and the test piece at a pressure of 10 kg/cm$^2$, a linear sliding velocity of 30 cm/sec, a contact area of 2.0 cm$^2$ and a travelling distance of 6.5 km. Bending strength and bending modulus were measured in accordance with ASTM D 790.

Separately, polyacetal resin compositions containing no additives and containing only glass fibers were tested in the same manner as above and the results are shown in the same Table as Comparative Examples. As is obvious from these results, the composition according to the present invention shows not only superior friction-abrasion characteristics but also high rigidity and strength. Accordingly, the composition according to the present invention is very usefully applied in the uses where not only superior sliding characteristics but also high rigidity and strength are required.

| Composition (% by weight) and physical properties | Example | | | | | | | Comparative example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Polyacetal resin | 70 | 80 | 90 | 80 | 70 | 88 | 79.8 | 100 | 90 | 80 | 75 | 99.8 | 99.8 |
| Potassium titanate fiber | 30 | 20 | 7 | 10 | 20 | 10 | 20 | | | | | | |
| Fluororesin | | | 3 | 10 | 10 | | | | 10 | 20 | | | |
| Silicone oil | | | | | | 2 | | | | | | | 2 |
| Glass fiber | | | | | | | | | | | 25 | | |
| Calcium stearate | | | | | | | 0.2 | | | | | 0.2 | |
| Specific abrasion (mm$^3$/kg · km) × 10$^{-2}$ | | | | | | | | | | | | | |
| Resin side | 41.4 | 18.3 | 5.4 | 2.5 | 10.1 | 3.8 | 18.0 | 3.2 | 1.2 | 0.5 | 102.3 | 3.1 | 1.7 |
| Metal side | 0.7 | 0 | 0 | 0 | 0 | 0 | 0 | 0 | 0 | 0 | 3.2 | 0 | 0 |
| Bending strength (kg/cm$^2$) | 1800 | 1650 | 1270 | 1300 | 1450 | 1380 | 1650 | 980 | 860 | 800 | 1970 | 980 | 820 |
| Bending modulus (kg/cm$^2$) × 10$^4$ | 8.7 | 6.5 | 3.7 | 4.3 | 6.8 | 4.3 | 6.5 | 2.6 | 2.5 | 2.4 | 7.7 | 2.6 | 2.5 |
| Thermal deformation temperature (°C.) | 161 | 160 | 144 | 149 | 158 | 150 | 160 | 110 | 107 | 100 | 163 | 110 | 110 |

(Note): The amounts of addition are shown in % by weight based on the total composition.

The embodiments of the invention of which an exclusive property or privilege is claimed are defined as follows:

1. A polyacetal resin composition which comprises a polyacetal, a potassium titanate fiber and a fluororesin abrasion resisting agent.

2. A polyacetal resin composition as set forth in claim 1, wherein said potassium titanate fiber is added in an amount of 1 to 40% by weight based on the total composition.

3. A polyacetal resin composition as set forth in claim 1, wherein said abrasion resisting agent is added in an amount of 0.5 to 30% by weight based on the total composition.

4. A polyacetal resin composition as set forth in claim 2, wherein said potassium titanate fiber is added in an amount of 5 to 30% by weight based on the total composition.

5. A polyacetal resin composition as set forth in claim 1, wherein said fluororesin is added in an amount of 2 to 10% by weight based on the total composition.

* * * * *